United States Patent [19]

Miller, Jr.

[11] Patent Number: 4,790,099

[45] Date of Patent: Dec. 13, 1988

[54] ICE FISHING SIGNAL AND REPORTING DEVICE

[76] Inventor: John Miller, Jr., R.D. #5, Amsterdam, N.Y. 12010

[21] Appl. No.: 913,250

[22] Filed: Sep. 30, 1986

[51] Int. Cl.$^4$ .................. A01K 85/01; A01K 97/01
[52] U.S. Cl. .............................................. 43/17
[58] Field of Search ........................... 43/17, 16, 15

[56] References Cited

U.S. PATENT DOCUMENTS

| | | | |
|---|---|---|---|
| 2,354,279 | 7/1944 | Ross | 43/17 |
| 2,785,493 | 3/1957 | Thiel | 43/17 |
| 2,786,294 | 3/1957 | Whitacre | 43/17 |
| 3,078,610 | 2/1963 | Howell | 43/17 |
| 3,199,241 | 8/1965 | Mauritz | 43/17 |
| 3,470,647 | 10/1969 | Horner | 43/17 |
| 4,447,979 | 5/1984 | Taylor | 43/17 |
| 4,458,437 | 7/1984 | Ou | 43/17 |
| 4,620,387 | 11/1986 | Bloom | 43/17 |

Primary Examiner—Gene P. Crosby
Attorney, Agent, or Firm—Schmeiser, Morelle & Watts

[57] ABSTRACT

An ice fishing signaling and reporting device is disclosed having an audio alarm with a button for activating and deactivating the alarm. The button on said audio alarm is biased to its off position, and a cantilever is hingingly connected to the alarm for depressing the button, activating the alarm, when tension is applied to a fishing line guided over the cantilever.

2 Claims, 2 Drawing Sheets

Fig_1

ICE FISHING SIGNAL AND REPORTING DEVICE

FIELD OF THE INVENTION

Generally this invention relates to fishing, and more specifically to signaling devices for ice fishing.

BACKGROUND OF THE INVENTION

Ice fishing tip-ups are well known, and encompass a wide variety of styles and operative characteristics. Typically a tip-up has a flag which is mounted on a bendable metallic pole or strip. In use, the metallic strip is flexed and lightly secured beneath a latch. When a fish strikes the line, a mechanical coupling causes the latch to release the flag, which springs to an erect position. One variation of this mode of operation includes the addition of or substitutes a signaling light to notify the user that the latch has been tripped. Once activated the alarm(s) is activated and the fisherman has no other indicator to determine how the fish is acting.

In the conventional tip-up, the line and its spoolpiece are underwater (to prevent freezing); and, it is generally not possible to determine if the fish has taken the bait and is running with it, or if the latch was simply released when the fish first nibbled the bait. Thus, the fisherman must view or retrieve the underwater spool, often being required to first or break the ice in the hole, to determine if the spool is unwinding. Either of these actions might frighten the fish if it has not in fact taken the bait.

Depending upon the amount of food available, water temperature and other factors, fish exhibit various eating characteristics. One common characteristic is for the fish to test the bait. They do this by either nibbling the bait or else turning the bait around by striking it and then expelling it. If satisfied with this nibble or first strike, the fish then returns, taking the bait and running with it. At other times, a fish will strike the bait only once and begin running immediately. In this latter situation, the fisherman risks having the line run out. If the line runs out the entire tip-up may be pulled through the hole, or the hook may be ripped from the fish's mouth. Also, where there is an excessive amount of line out, there is a greater likelihood that the line will become entangled in debris. To avoid these problems the fisherman must know whether the fish is running with the bait or simply nibbling at the bait.

With the tip-ups now available, the fisherman is only notified that the flag has been released; caused by wind or rotation of the spool. Assuming that the tripping of the latch was caused by a fish striking the bait, the fisherman has received all the information he can obtain from the tip-up. Until the spool is withdrawn from the water or visual observation is made, the fisherman cannot determine whether the fish tool the bait or was simply sampling it. Thus, he does not know if he should set the hook or wait for a second strike. Of course, he will not be notified of the second strike by the tip-up since the flag has already been released.

Conventional flag type tip-ups, are often subject to false alarms. These are commonly referred to as wind flags. Thus, the fisherman spends a great deal of time and effort going out to check and reset these false alarms, never knowing if he has a fish on the line. In addition, setting these flags repeatedly is a tedious activity. Temperatures are usually low and windfall factors only exacerbate the problems. Setting the flags while wearing heavy gloves is extremely difficult and, if the fisherman must remove the gloves to set the tip-ups, he becomes subject to the discomfort of often extreme temperatures. Thus, setting (temperamental) flags is not only time consuming and frustrating it may also be painful.

Because fisherman set a number of tip-ups, it is common for one of the first set tip-ups to be activated while the others are being set. Since the tip-up alarm is only visual and the fisherman is concentrating on setting the remaining tip-ups, the alarm often goes unnoticed and the fish is lost.

With all the present ice fishing devices the fisherman receives a one time warning that the latch has been released but receives no continual information concerning the fish.

It is therefore an object of this invention to provide a new and improved ice fishing device which continuously reports the action of the fish taking the bait.

Another object of this invention is to provide a new and improved ice fishing device which is not subject to false readings or alarms.

Another object of this invention is to provide a new and improved ice fishing device which does not need to be reset after each use.

Still another object of this invention is to provide a new and improved ice fishing device which is not solely visual.

Yet another object of this invention is to provide a new and improved ice fishing device which is easy to set up and break down, and inexpensive to manufacture.

Objects and advantages of the invention are set forth in part herein and in part will be obvious here from, or may be learned from practice with the invention even by novices to the sport of ice fishing.

SUMMARY OF THE INVENTION

It has been found that the objects of this invention may be realized by using a primary audio alarm having an activating button which is biased to an off position. A cantilever, over which the fishing line is guided, rests upon the button, and activates the audio alarm when there is an increase of tension on the line. Advantageously, the amount of pressure on the button needed to activate the alarm may be varied. Also, the audio alarm may be used with any other visual alarm, such as a flag, to quickly identify the activated device.

The signal and reporting device herein disclosed provides a remarkably accurate indication of the status of the fish and bait. In addition, it adds greater variety to the sport as the fisherman reads the signals and actually plays the fish before ever touching the line. The information obtained through this device results in more appropriate action by the fisherman and greater success. Since the button is biased to an off position and the weight of the cantilever is not sufficient to activate the alarm, there is no need to reset the alarm after it has been activated. The fisherman has only to remove the fish, rebait the hook and drop the line back into the water.

It will be understood that the foregoing general description and the following detailed description as well are exemplary and explanatory of the invention but are not restrictive thereof. Thus, while the accompanying drawings referred to herein and constituting a part hereof illustrate preferred embodiments of the invention, and together with the description, serve to explain the principles of the invention, the scope of said invention should only be limited by the appended claims.

DESCRIPTION OF THE PREFERRED EMBODIMENTS

Figure 1:
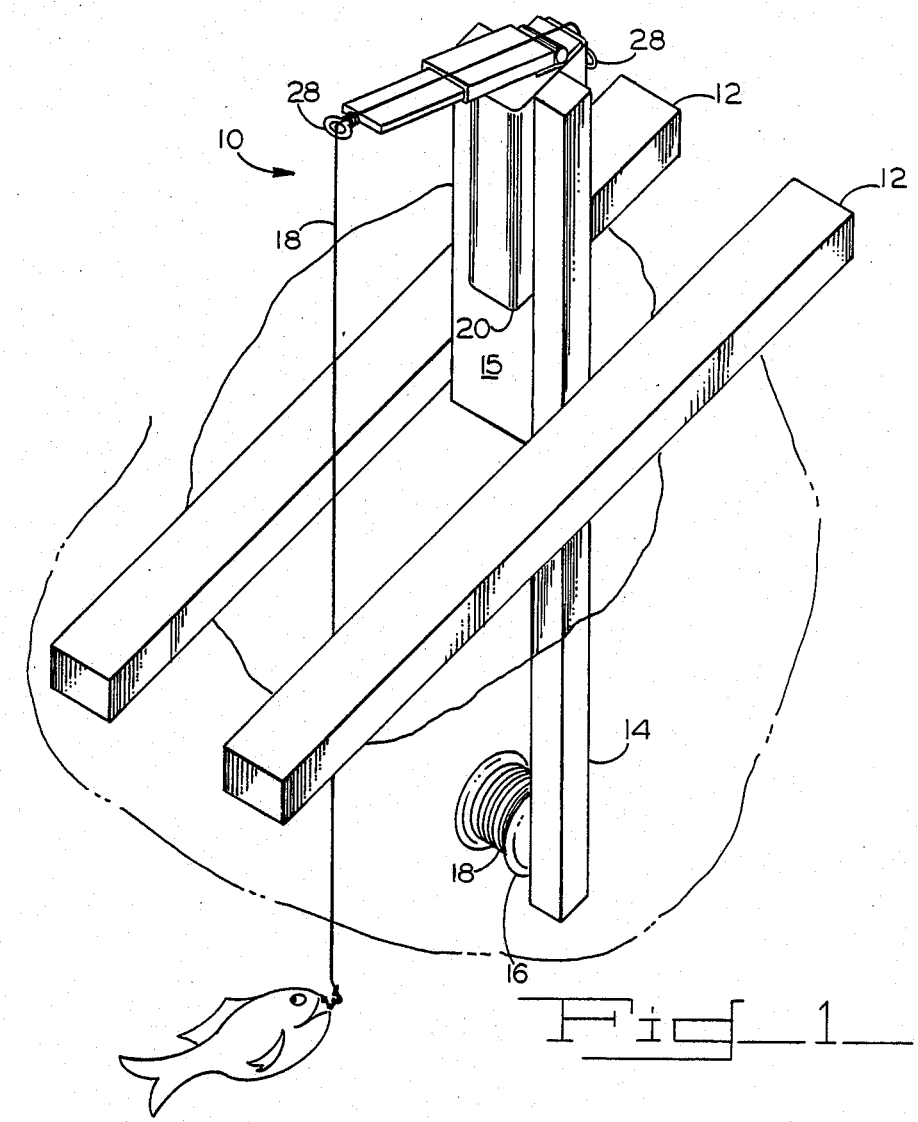
FIG. 1 is an isometric view of the invention in its operative position over an ice fishing hole.

FIG. 1 discloses the invention in combination with the tip-up support generally designated as 10. The tip-up support has two cross bars 12 which are pivotally secured to an upright post 14. Thus, the cross bars 12 and upright post 14 may be rotated with respect to one another so as to be parallel. At the lower portion of upright post 14 is a rotatable spool 16. Wound about the spool 16 is fishing line 18. Attached to the top of the post 14 is the signaling and reporting device 20.

In my preferred embodiment, a support 15 is secured to the upright post 14. The support 15 and top portion of post 14 form a "U" shaped holder for the signal and reporting device 20. It should be noted however, that the device 20 could be secured to the post 14 without support 15.

Figures 2, 3:
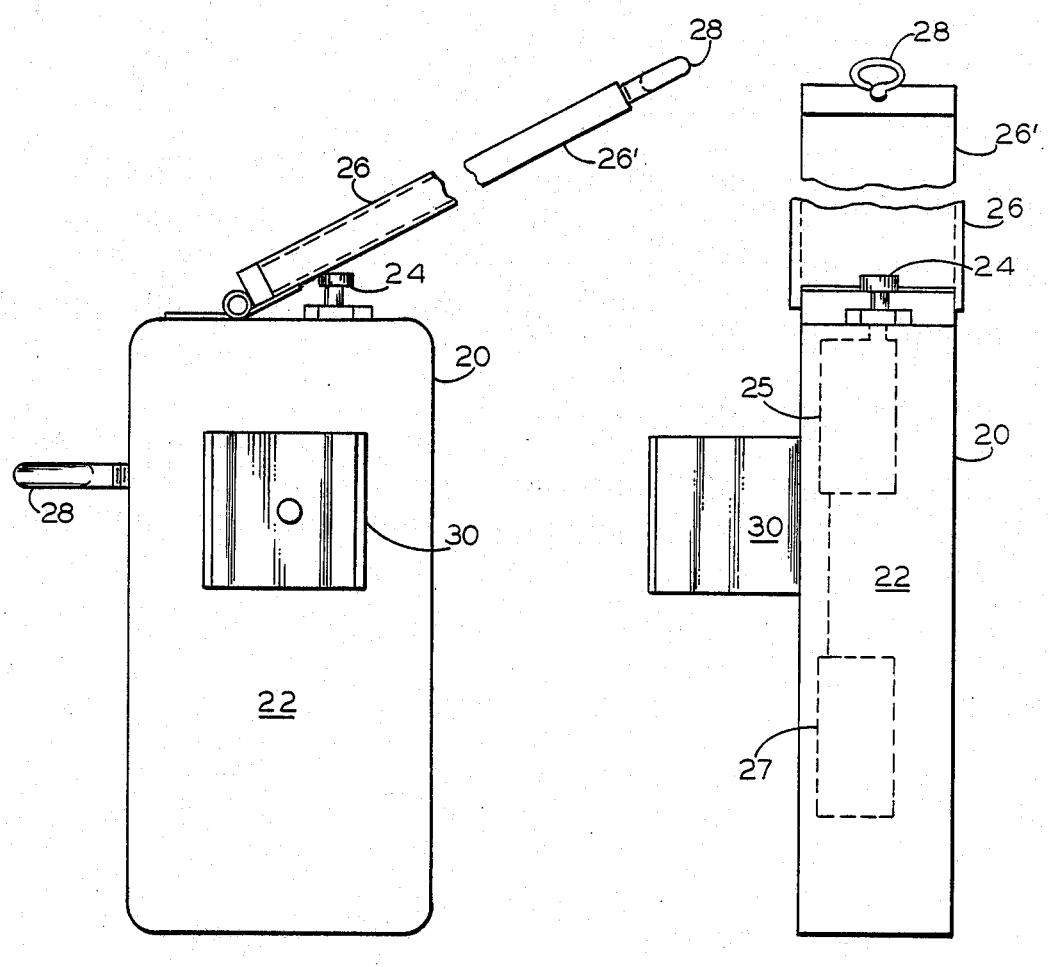
FIG. 2 is a side view of the audio alarm of this invention.
FIG. 3 is a front view of said audio alarm.

As shown in FIG. 2 the signal and reporting device 20 has a main body portion 22. This main body portion contains a sensor 25 shown in FIG. 3 as a dotted box connected to plunger 24 and an audio alarm 27 which may be any one of a number of different types of alarms presently available on the market. Since these alarms are commonly available, the actual operation of the alarm mechanism will not be discussed herein. On top of the body 22 is a button 24 which when depressed activates the audio alarm. When released, the button 24, which is biased to its upward position, deactivates the alarm and maintains alarm silence. A cantilever 26 is hingedly connected to the top of the body 22, and rests upon the button 24. The weight of the cantilever alone is insufficient to depress the button and activate the alarm.

Two eyelets 28 are connected to the device 20. One of the eyelets is secured to the end of the cantilever, opposite its hinged connection; and the other eyelet is secured to the side of the body. These eyelets serve as guides for the fishing line 18.

Along one of the sides of the body 22 is a clamp 30 which is used to secure the device 20 to the upright post 14.

In operation, the cross bars 12 are rotated so as to be perpendicular to the upright post 14. The fishing line 18 is drawn along the upright post 14 and through the eyelets 28 and then directed downward between the cross bars 12. Thus, the string travels longitudinally over the cantilever 26 and 26' which telescopes within cantilever 26. Tension on the string beyond a predetermined amount, which may be varied by moving 26', causes the cantilever to depress button 24 and activate the audio alarm. Similarly the release of tension from the fishing line 18 results in the regression of the button to its off position, thus deactivating the alarm.

It should be appreciated that a number of variations may be made on this invention without departing from the thesis of the invention which is intended to be limited only by the scope of the appended claims. For example, the cantilever 26 can be made to telescope, so as to allow adjustments in the amount of tension required to depress the button 24. Similarly, either of the eyelets 28 may be rotated to limit the free movement of the fishing line 18 through said eyelets. Since the signal and reporting device 20 attaches to a standard upright post 14 it should be evident that any other type of signaling device may also be incorporated. For example, it would be reasonable to attached a standard flag tip-up to the upright post 14 which flag would be moved to an erect position upon rotation of the spool 16. Should one with to use a more sophisticated alarm device the alarm output could increase in proportion to the pressure of the button 24. This would give the fisherman some indication as to how fast the fish is running with the line.

I claim:

1. An ice fishing signaling and reporting device comprising:

attachment means for securing the device to a tip-up support;

guide means on said device adapted to receive and orient the travel of fishing line;

means for sensing an increase in tension on the fishing line beyond a predetermined limit;

alarm means having a normally biased inactive state and an active alarm state said alarm state being entered in response to tension on the fishing line exceeding a predetermined limit as sensed by said tension sensing means, whereby said alarm state automatically activates and deactivates as the line tension alternates above and below said predetermined limit, respectively;

means for adjusting the tension required on the line to activate the alarm;

a button which activates the alarm when said button is depressed, said button biased to its inactive state; and a cantilever, over which the fishing line is guided, for depressing said button when the tension on the line increases and exceeds said predetermined limit, said cantilever telescoping between an advanced and retracted position.

2. The invention of claim 1 wherein said alarm is an audio alarm.

* * * * *